A. B. RONEY.
AEROPLANE PROPULSION BY MEANS OF QUARTER TURN QUARTERED PADDLE WHEEL PROPELLER ASSEMBLIES.
APPLICATION FILED JUNE 7, 1920.
1,365,727.  Patented Jan. 18, 1921.
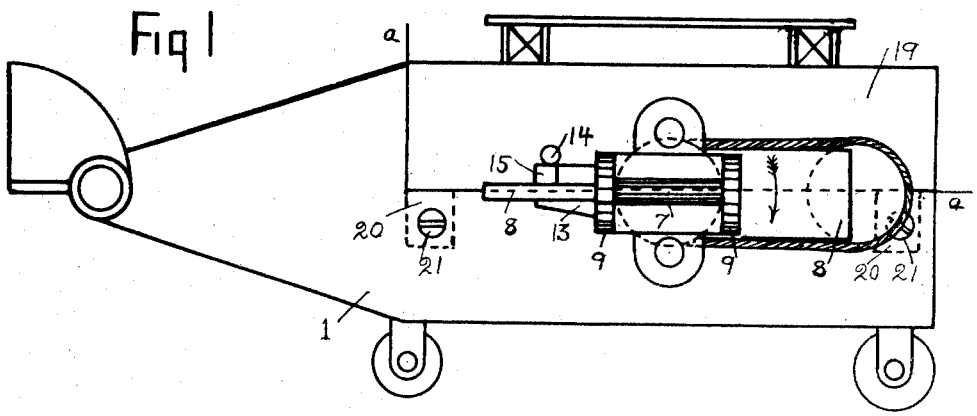
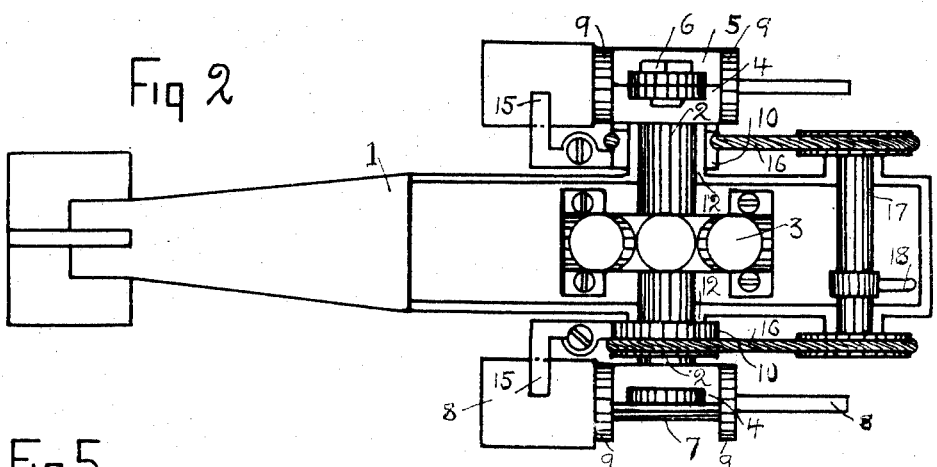
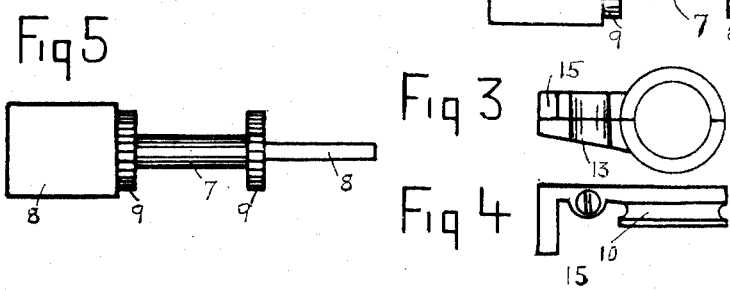
WITNESSES
INVENTOR
Alexander B Roney

UNITED STATES PATENT OFFICE.

ALEXANDER B. RONEY, OF CHICAGO, ILLINOIS.

AEROPLANE PROPULSION BY MEANS OF QUARTER-TURN QUARTERED-PADDLE-WHEEL PROPELLER ASSEMBLIES.

1,365,727. Specification of Letters Patent. Patented Jan. 18, 1921.

Application filed June 7, 1920. Serial No. 387,226.

*To all whom it may concern:*

Be it known that I, ALEXANDER B. RONEY, a citizen of the United States, residing at Chicago, county of Cook, and State of Illinois, have invented new and useful Improvements for Aeroplane Propulsion by Means of Quarter-Turn Quartered-Paddle-Wheel Propeller Assemblies, of which the following is a specification.

Figure 1 is a view of Fig. 2, on the line a—a.

Fig. 2, is a side view of Fig. 1. Figs. 3 and 4, are detail views of a tumbler ring, referred to elsewhere. Fig. 5 is a detail view of the quarter-blade propeller referred to elsewhere.

My invention as herewith illustrated avoids the use of hood parts for determining the direction of propulsion by fan propellers.

Out through the opposite sides of the fuselage 1, project the opposite ends 2, 2, of the drive shaft portions, of the motor part 3, which is fastened to the bottom of the fuselage, and said ends terminate in split boxes 4, 4, that are carried on those extreme ends of the drive shaft, and, they have removable cap parts 5, 5, that are bolted to them by the cap screws 6, 6; then, observe that the line of bore through these axle boxes 4, 4, is at right angles to the line of the drive shaft 2, for they are used as a housing or bearing for the axle members 7, of the fan propellers 8, 8; then, as shown in Fig. 2 and Fig. 1, the cap part 5, is removed to show how the said axle members 7, are lodged in the other half of said split boxes which are adapted to be axially carried and radially swung around the axis, of the motor's drive shaft 2; also observe, that the scheme of these fan propellers embody special design, for each one comprises two paddle parts 8, 8, that are tied together by an axle part 7, so that the plane of each paddle part is at right angles to the plane of the other and, said axle part 7, have collar members 9, 9, that prevent end play of the paddle parts against the ends of said boxes and, at the same time gives them abutment strength with the end portions of said axle 7.

Observe also, that the motor and drive shaft with its axially mounted fan propellers are a one piece assembly that can be lifted out of the fuselage 1, when the tumbler rings 10, 10, which are made in halves are disassembled from the fuselage hubs 12, 12, on removal of the screws that hold them together and that it is by means of these tumbler rings that the paddle parts of the fan propellers are given intermittent quarter turns on their axle parts in their respective bearings with each half turn of the drive shaft; also, that the tumbler rings are rotatable on the fuselage hubs to the extent of a quarter turn also, (see Fig. 1,) the tumbler shank parts 13, are in abutment with the stop pins 14, that project from the fuselage, and from the side of each tumbler shank project lugs 15, then in Fig. 2, one-half of the left hand tumbler ring is removed to show that they are loose on the fuselage hubs, and these tumbler rings are connected by cable parts 16, 16, to the opposite ends of the jack shaft 17, which has a handle 18, by means of which it can be turned to turn the rings on the fuselage hubs so as to position the tumbling lugs 15, 15, at the will of the operator.

Then for purposes of assembling the propelling apparatus, as above described to the fuselage 1, said fuselage is provided with a removable cap part 19, that is bolted to it after the manner of a split journal box having telescopic lugs 20, 20, that are secured to the fuselage by the threaded plugs 21, 21.

My new fan propeller, consists of three members, of which the middle or axle member has its terminal ends flattened out into blades or paddle members, the planes of which are fixed at right angles to each other along the center line of axle part and the width of both paddle members are equi-distant on opposite sides of the center lines of the axle member in order to equalize the wind pressure on both sides of said axle part and thus prevent them being turned by their slap on the air, for they are adapted to be quarter-turned on their axles only by the tumbler lugs 15, 15, which if too short will not effect a complete quarter-turn, they must be of proper length to insure this.

In operation each half turn of the drive shaft throws the rear members of both fan propellers radially against the lugs 15, 15, that butts them a quarter-turn around on their axle parts, which allows them to slip past the said lugs as a blade and cut through the air for the following half throw or turn of the drive shaft, yet while the rear members were being changed from paddles to blades the front members were also changing from blades to paddles because the front paddles are at right angles to the rear paddles on the same axle part, consequently paddle propulsion continuously in the one direction is the result; then for the purpose of changing the direction of propulsion in this instance from the horizontal to the vertical, the rings 10, are made adjustable on the hubs 12, 12, by operating the lever 18, so that the propulsion can be used as a brake to control the descent of the machine by throttling the motor.

I claim—

A quarter turn quartered paddle wheel propeller assembly comprising, an axle part bounded longitudinally by abutment collars, said collars bounded longitudinally by paddle blades, the planes of said paddle blades quartered and abutting said collars at right angles to each other along the center line of said axle part, in combination with an aeroplane and fuselage assembly, having a horizontal drive shaft projecting from opposite sides of the fuselage body, with said quartered paddle wheel propellers revolubly mounted on both ends of said shaft, with the axis of both propeller assemblies at right angles to the axis of said drive shaft and the quartered paddles of each propeller assembly quarter turned by an adjustably stationed bumper lug.

ALEXANDER B. RONEY.

Witnesses:
O. J. ROSENBERGER,
LILLIAN E. LE CLAIRE.